US009343819B2

(12) United States Patent
McGann et al.

(10) Patent No.: US 9,343,819 B2
(45) Date of Patent: May 17, 2016

(54) SWAGED CONNECTORS FOR A GROUNDING GRID

(71) Applicant: DMC Power, Inc., Gardena, CA (US)

(72) Inventors: Shawn Kerry McGann, Yorba Linda, CA (US); Luis Sosa, Los Angeles, CA (US)

(73) Assignee: DMC Power, Inc., Carson, CA (US)

( * ) Notice: Subject to any disclaimer, the term of this patent is extended or adjusted under 35 U.S.C. 154(b) by 201 days.

(21) Appl. No.: 14/023,369

(22) Filed: Sep. 10, 2013

(65) Prior Publication Data

US 2015/0072574 A1 Mar. 12, 2015

(51) Int. Cl.

| | |
|---|---|
| ***H02G 15/08*** | (2006.01) |
| ***H01R 4/10*** | (2006.01) |
| ***H01R 4/18*** | (2006.01) |
| ***H01R 4/64*** | (2006.01) |
| ***H01R 11/01*** | (2006.01) |
| ***H01R 11/09*** | (2006.01) |
| *H01R 11/32* | (2006.01) |
| *H01R 101/00* | (2006.01) |

(52) U.S. Cl.

CPC .................. *H01R 4/10* (2013.01); *H01R 4/183* (2013.01); *H01R 4/646* (2013.01); *H01R 11/01* (2013.01); *H01R 11/09* (2013.01); *H01R 11/32* (2013.01); *H01R 2101/00* (2013.01)

(58) Field of Classification Search

CPC ......................................................... H01R 4/20

USPC ....... 174/84 C, 94 R; 439/880; 403/278, 279, 403/281; 29/517

See application file for complete search history.

(56) References Cited

U.S. PATENT DOCUMENTS

| | | | | |
|---|---|---|---|---|
| 1,407,477 A * | 2/1922 | Plimpton | .................... | 24/135 L |
| 2,106,724 A * | 2/1938 | Cope | ............................ | 439/783 |
| 2,995,615 A | 8/1961 | Gibbon | | |
| 3,088,761 A | 5/1963 | Myers | | |
| 3,185,762 A | 5/1965 | Shaw | | |
| 3,297,817 A * | 1/1967 | Stier | .............................. | 174/87 |

(Continued)

FOREIGN PATENT DOCUMENTS

| | | |
|---|---|---|
| DE | 667027 | 11/1938 |
| FR | 2057638 | 5/1971 |

OTHER PUBLICATIONS

Extended European Search Report dated Feb. 4, 2015, EP Appln. No. 14182331.0, 8 pages.

Burndy LLC, Burndy Copper Compression Connections: C-TAP, H-TAP and T-Couplers, Information sheets, accessed via Internet at burndy.com on Jun. 3, 2013, 8 pages.

(Continued)

*Primary Examiner* — Neil Abrams

(74) *Attorney, Agent, or Firm* — Blakely Sokoloff Taylor & Zafman LLP

(57) ABSTRACT

A family of swaged connectors has particular application for joining segments of copper cable that make up a subterranean grounding grid in an electrical utility substation. The connectors have a body member with at least one swage region having a trough for receiving an electrical conductor. The swage region has an opening extending the length of the trough to allow insertion, in a radial direction, of the electrical conductor into the trough. An insert is configured for mating engagement with the opening in the swage region, such that, when the insert is mated with the body member, an electrical conductor disposed within the trough is radially entrapped in the connector. The connector body and insert have a cylindrical outer surface in the swage region to facilitate swaging the connector to secure it to the electrical conductor. The connector may be configured as a lap splice, tee or elbow.

9 Claims, 7 Drawing Sheets

(56) References Cited

U.S. PATENT DOCUMENTS

| | | | | |
|---|---|---|---|---|
| 6,909,049 | B2 * | 6/2005 | DiTroia | 174/84 C |
| 2009/0250508 | A1 | 10/2009 | Sokol et al. | |
| 2015/0072574 | A1 * | 3/2015 | McGann | H01R 4/183<br>439/879 |

OTHER PUBLICATIONS

Thomas & Betts, Blackburn E-Z-Ground Grounding Connectors, Catalog pages, accessed via Internet at tnb.com on Jun. 3, 2013, pp. C-55-C61.

* cited by examiner

SWAGED CONNECTORS FOR A GROUNDING GRID

BACKGROUND OF THE INVENTION

1. Field of the Invention

This invention relates to the field of connectors for electrical conductors, and, more particularly to swaged connectors for use in a grounding grid.

2. Background

Substations in electrical power distribution systems require a properly designed and installed grounding system to insure reliable performance. Grounding is typically accomplished with a grid of electrical conductors buried in the soil. The substation equipment is connected to the grounding grid by means of cables, rods or bars that are securely connected to the grid.

Connections within and to the grid are typically made using special purpose connectors that are crimped to a grid conductor. The crimping process used to secure a connector concentrates the compressive force at one or a few locations around the circumference of the conductor. This localized concentration of force can result in a poor electrical connection. Swaging is a process that distributes compressive force evenly around the circumference of a cylindrical body. Therefore, a properly swaged connector will generally provide a superior connection in comparison to a crimped connector.

SUMMARY OF THE INVENTION

The present invention provides a family of swaged connectors with particular application for joining segments of copper cable that make up a subterranean grounding grid in an electrical utility substation. Removable inserts or “lids” allow the connectors to join onto existing continuous cables prior to installation.

The connectors comprise a body member with at least one swage region having a trough for receiving an electrical conductor, the swage region having an opening extending the length of the trough to allow insertion, in a radial direction, of the electrical conductor into the trough. An insert is configured for mating engagement with the opening in the swage region, such that, when the insert is mated with the body member, an electrical conductor disposed within the trough is radially entrapped in the connector. The connector body and insert have a cylindrical outer surface in the swage region to facilitate swaging the connector to secure it to the electrical conductor. The connector may be configured as a lap splice, tee or elbow.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
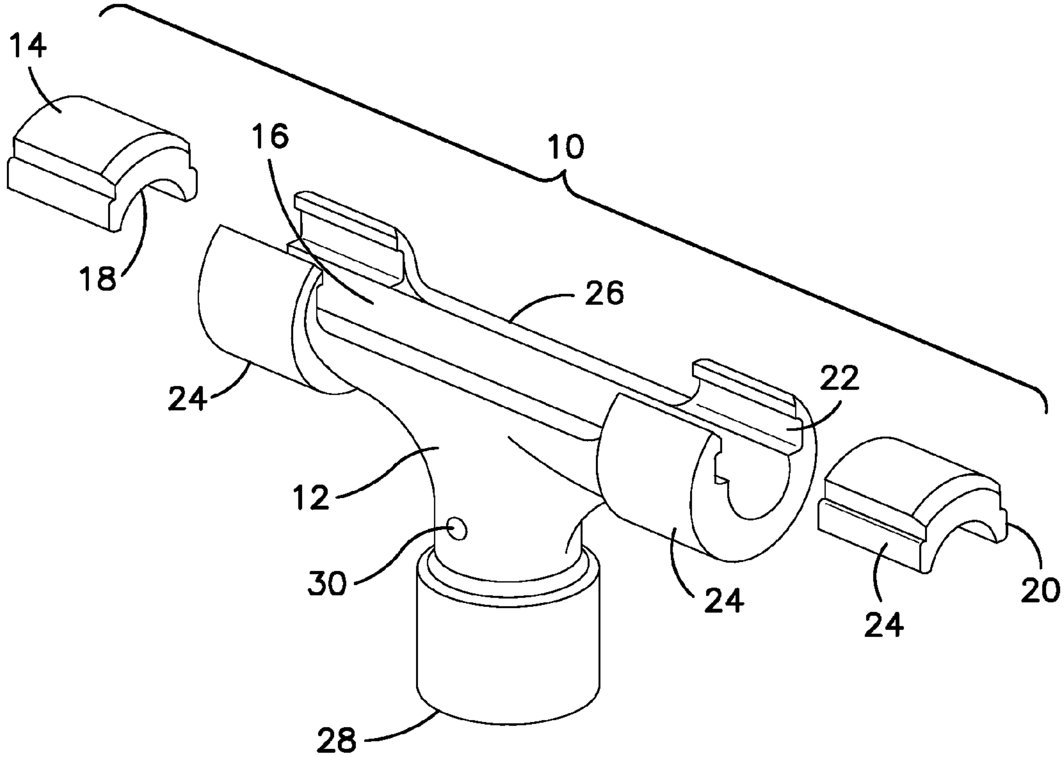
FIG. 1 is perspective view of a connector in accordance with a first embodiment of the invention.
Figure 2:
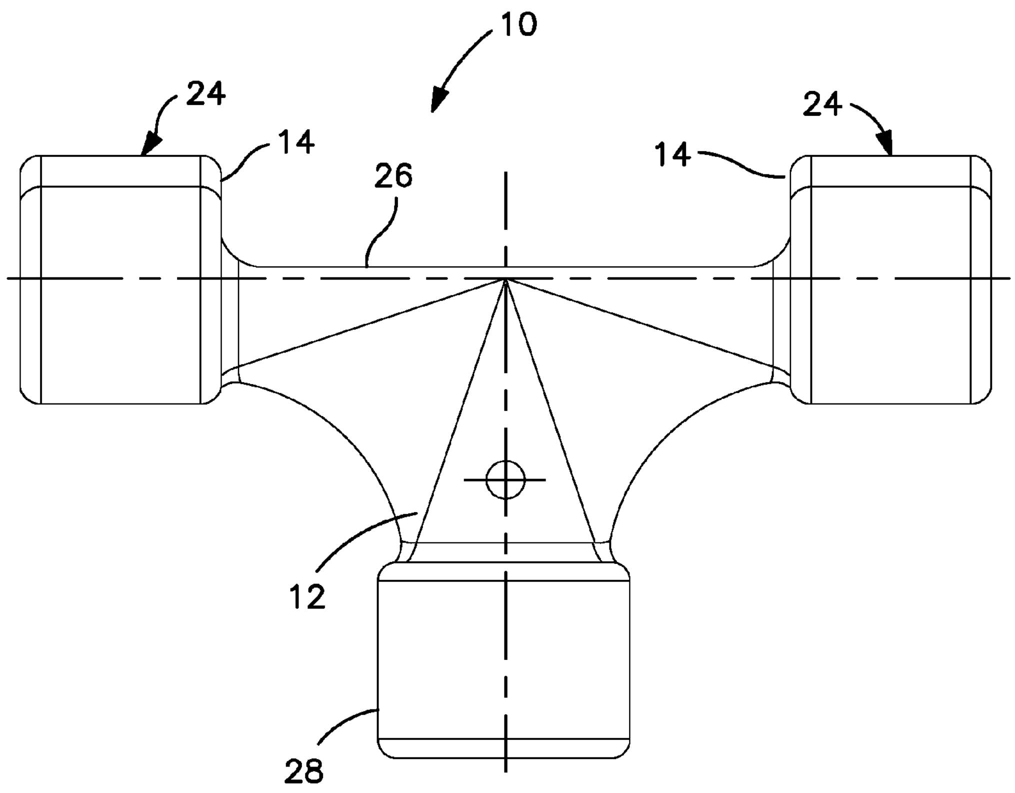
FIG. 2 is a side elevation view of the connector shown in FIG. 1.
Figure 3:
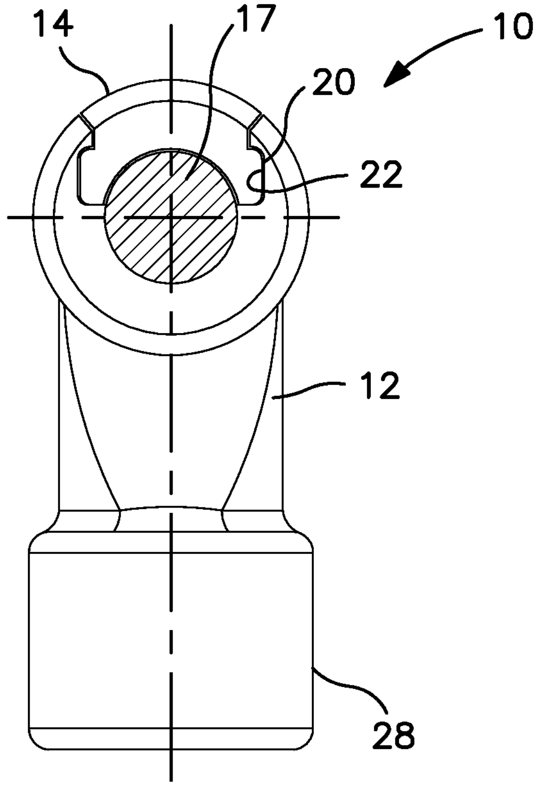
FIG. 3 is an elevation view of one end of the connector shown in FIG. 1.

FIGS. 1-3 illustrate a split tee grounding connector 10. The purpose of this connector is to join cable (copper-clad, copper stranded or solid copper) and/or ground rod (solid copper or copper clad/bonded) or rebar in a 90° configuration. Connector 10 comprises a body member 12 and a pair of inserts or “lids” 14. The body member and inserts are preferably made of high-purity copper, such as electrolytic tough pitch copper. With the inserts removed, connector body 12 has a nearly semi-cylindrical trough 16 for receiving a conductor cable 17. In one specific example, the diameter of the cylindrical trough is 0.594".

Inserts 14 are configured with a complementary cylindrical inner surface 18 such that the assembled connector has a complete cylindrical inner surface surrounding the cable in swage regions 24. Inserts 14 have flanges 20 that are received in corresponding slots 22 in body member 12. These flanges and slots define keying surfaces that assist axial insertion of the inserts into the body member and prevent the inserts from being removed radially. The flanges and slots may also be configured with an axial taper toward the center of the body member to prevent the inserts from sliding all the way through the slots and to temporarily wedge the inserts in the slots during installation prior to swaging.

Connector 10 is attached to a cable by first removing the inserts 14 and then placing the cable into trough 16. Inserts 14 are then inserted axially into slots 22. Swage regions 24 of the connector are then inserted into a suitable swage tool and uniformly radially compressed to retain the cable. In one specific example, the swage regions of the connector are 1.00" wide and have an outside diameter of 1.25". The swaging operation is preferably performed using the 360° Radial Swage Tool manufactured by DMC Power, Inc. of Gardena, Calif.

The center section 26 of the body member between the two swage regions 24 does not fully encircle the cable for the purpose of reducing the volume of material in the connector. The resulting shorter lengths of the inserts 14 increase the strength of the connector by minimizing the overturning moment created under a tensile load between the 90° portions of the connector.

Bottom tap 28 does not require an insert since the cable, rod or rebar can be inserted axially. The outside diameter of the bottom tap is sized for the swaging tool and will generally have the same outside diameter as swaging regions 24. A hole 30 is drilled to the center of the connector. This hole serves to verify proper insertion depth during installation and allows moisture to escape after installation.

Figure 4:
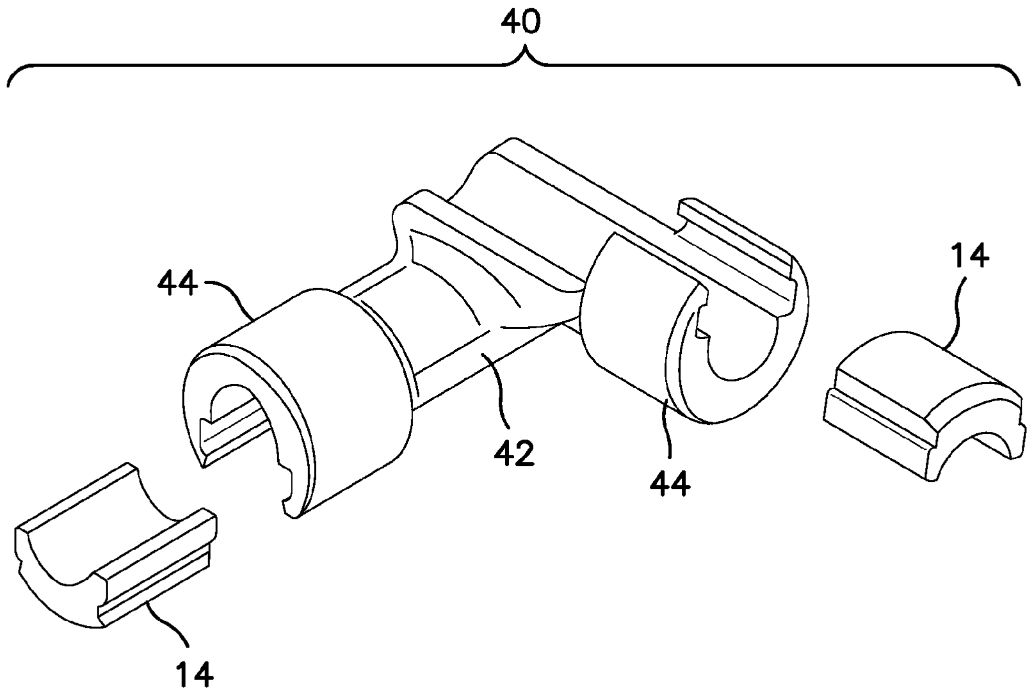
FIG. 4 is a perspective view of a connector in accordance with a second embodiment of the invention.
Figure 5:
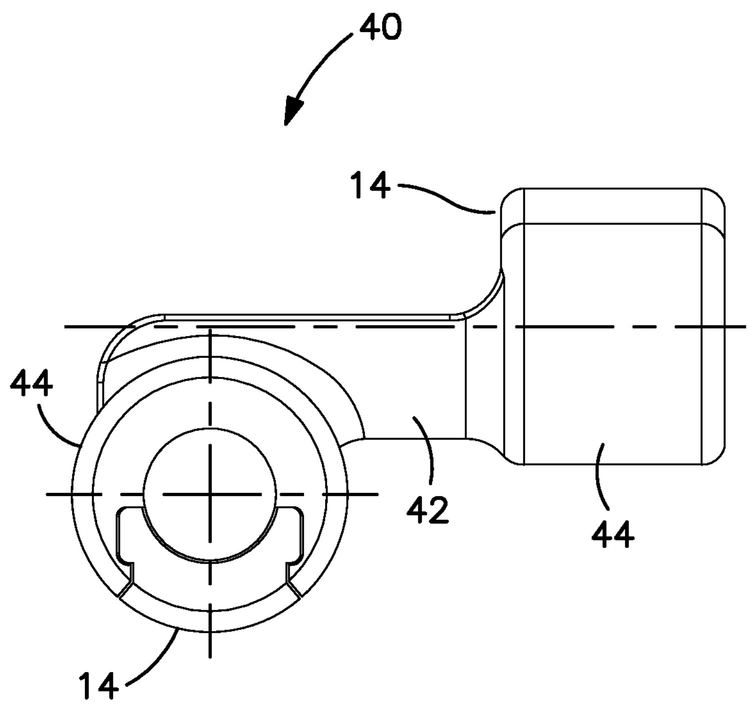
FIG. 5 is an elevation view of one end of the connector shown in FIG. 3.

FIGS. 4 and 5 illustrate an offset split elbow/tee/cross connector 40. This connector is designed to join cable and/or ground rod or rebar in a 90° offset configuration. The construction and assembly of connector 40 is essentially the same as for connector 10 described above. As with connector 10, the area behind the two swage regions 44 of body member 42 has been removed for material reduction and to minimize the overturning moment between the 90° portions.

Figure 6:
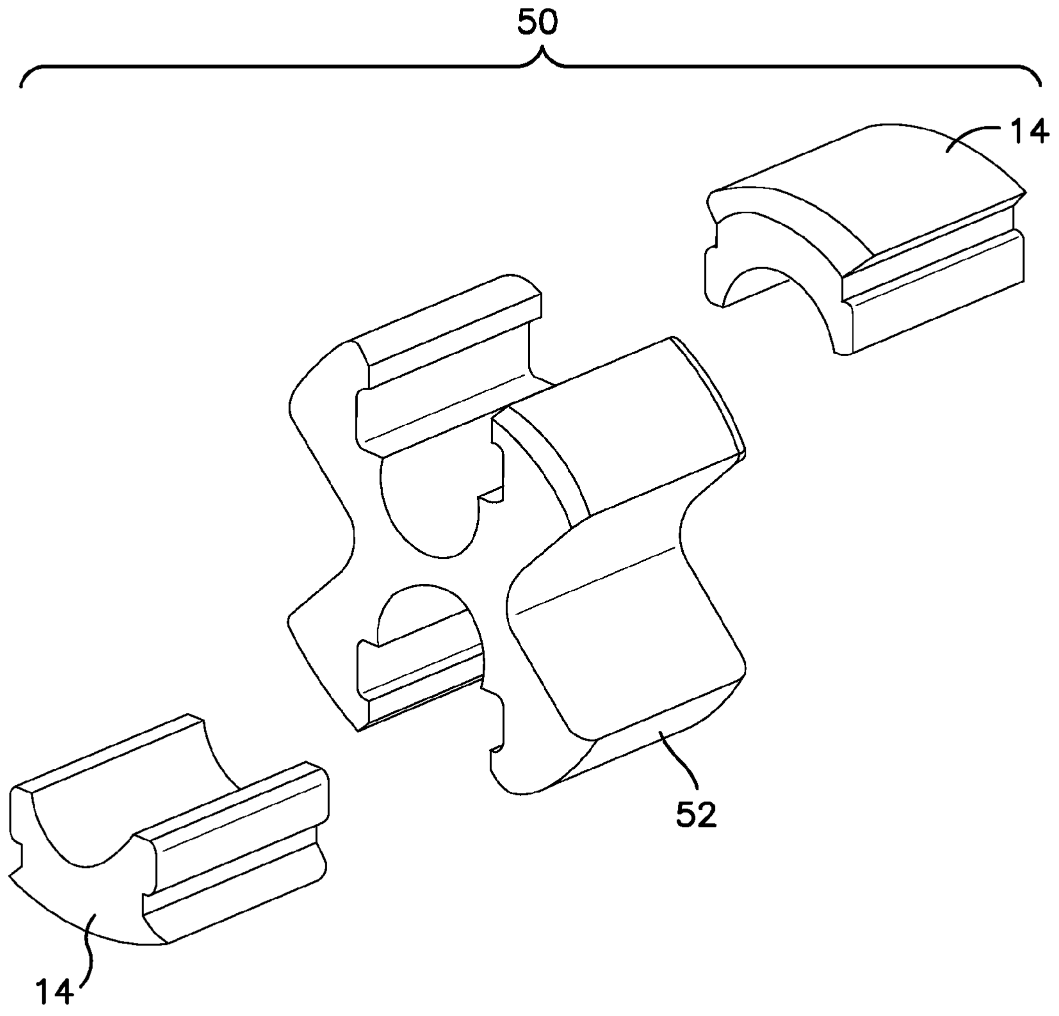
FIG. 6 is a perspective view of a connector in accordance with a third embodiment of the invention.
Figure 7:
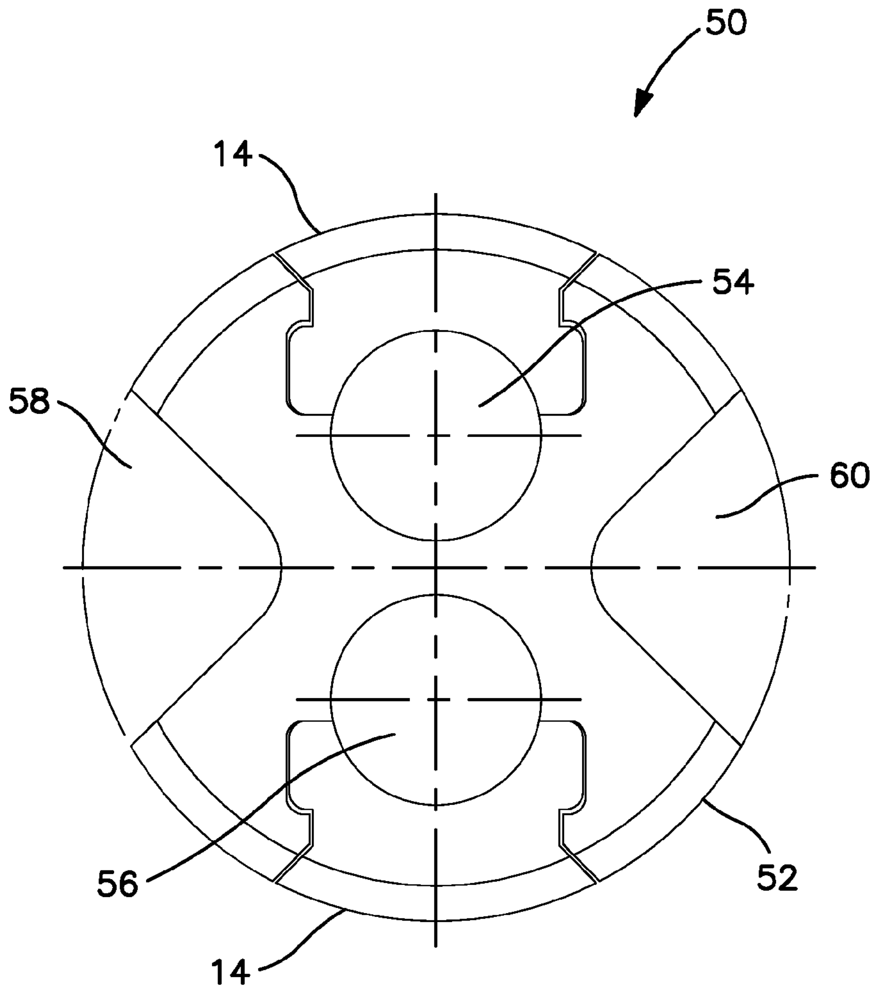
FIG. 7 is an elevation view of one end of the connector shown in FIG. 5.

FIGS. 6 and 7 illustrate a split parallel grounding connector 50. Two parallel holes 54 and 56 allow the connector to be used in various geometries with flexible cable, such as tee, offset cross, splice, or parallel continuous cable. As with the above-described connectors, connector 50 can be used with cable, ground rod and/or rebar. Two cutaway sections 58 and 60 on either side of connector body 52 serve dual purposes. First, they reduce the amount of material in the connector, allowing a smaller required force to plastically deform during swaging. Second, they provide an area where the fitting can further compress, even after the cable and connector interface have been fully compressed. This allows for range taking, i.e., the ability to accommodate various cable sizes with a single hole diameter.

Unlike the previously described embodiments, connector 50 does not have separate swage regions for the connected conductors. Instead, the entire connector body, with inserts 14, is inserted into a suitable swage tool and uniformly radially compressed to retain both of the conductors. In one specific example, the outside diameter of connector 50 is 2.00".

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A connector comprising:

a body member with first and second swage regions having respective first and second troughs for receiving respective electrical conductors, the body member having first and second openings extending a length of the respective troughs to allow insertion, in a radial direction, of respective electrical conductors into the respective troughs;

first and second inserts, each configured for mating engagement with a respective one of the openings such that, when the inserts are mated with the body member, the electrical conductors disposed within the troughs are radially entrapped in the connector.

2. The connector of claim 1 wherein the first and second swage regions are disposed at right angles to one another.

3. The connector of claim 1 wherein the first and second swage regions are coaxial and wherein the body member further comprises a tap portion having a cylindrical opening for receiving an additional electrical conductor.

4. The connector of claim 3 wherein the tap portion is disposed perpendicular to the two swage regions in a tee configuration.

5. The connector of claim 1 wherein the first and second troughs are oriented parallel to one another.

6. The connector of claim 1 wherein a transverse cross-section of the trough defines a first circular arc.

7. The connector of claim 6 wherein each insert has a trough with a transverse cross-section defining a second circular arc complementary to the first circular arc.

8. The connector of claim 1 wherein the body member and inserts have corresponding keying surfaces such that the inserts are axially insertable into the body member and are radially retained therein.

9. A method of attaching the connector of claim 1 to first and second electrical conductors comprising:

inserting the first electrical conductor into the first trough of the body member;

inserting the second electrical conductor into the second trough of the body member;

inserting the two inserts into the respective openings;

compressing the swage regions radially inwardly with a swaging tool.

* * * * *